Jan. 14, 1941. H. E. WURZBACH 2,228,294
MAGNETIC MATERIAL DETECTOR
Filed April 26, 1938 3 Sheets-Sheet 1
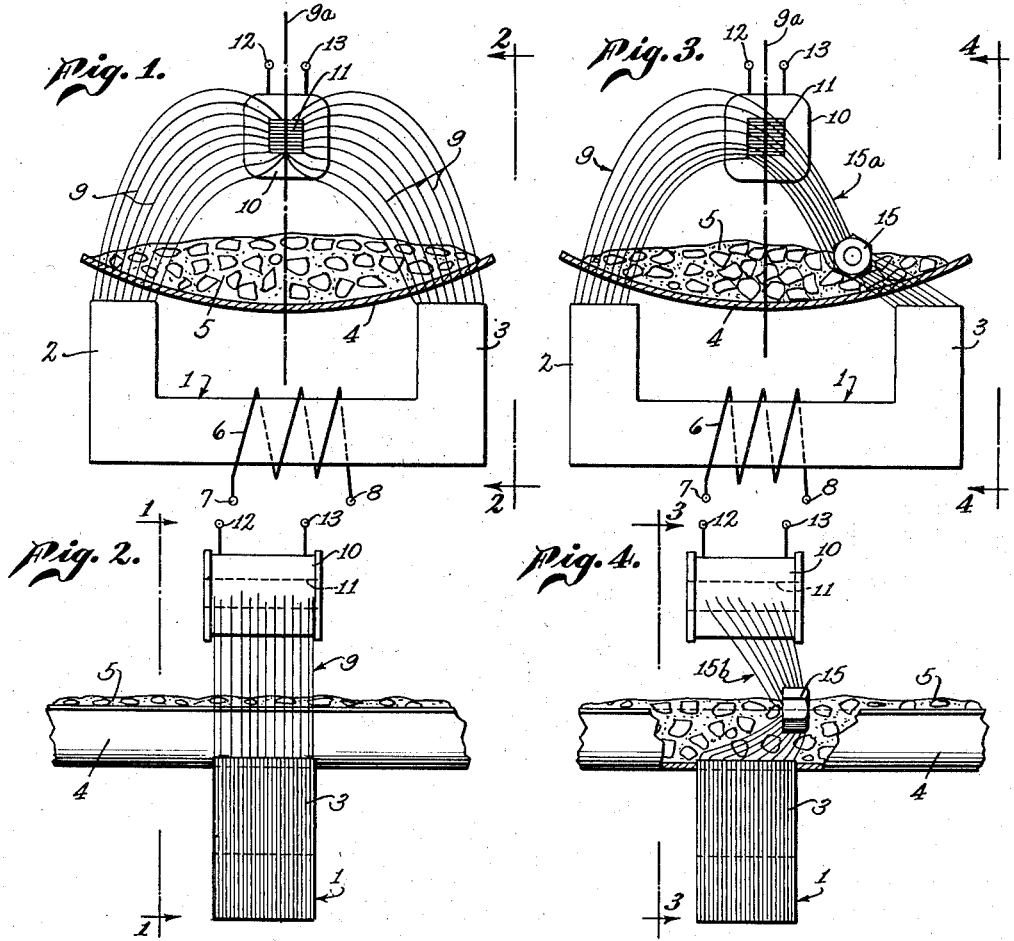
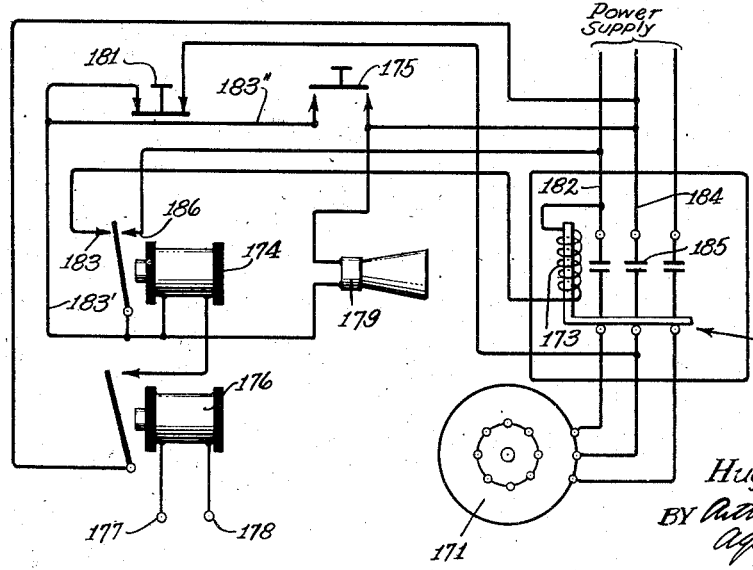
INVENTOR.
Hugh E. Wurzbach
BY
ATTORNEYS Jan. 14, 1941.  H. E. WURZBACH  2,228,294
MAGNETIC MATERIAL DETECTOR
Filed April 26, 1938   3 Sheets—Sheet 2
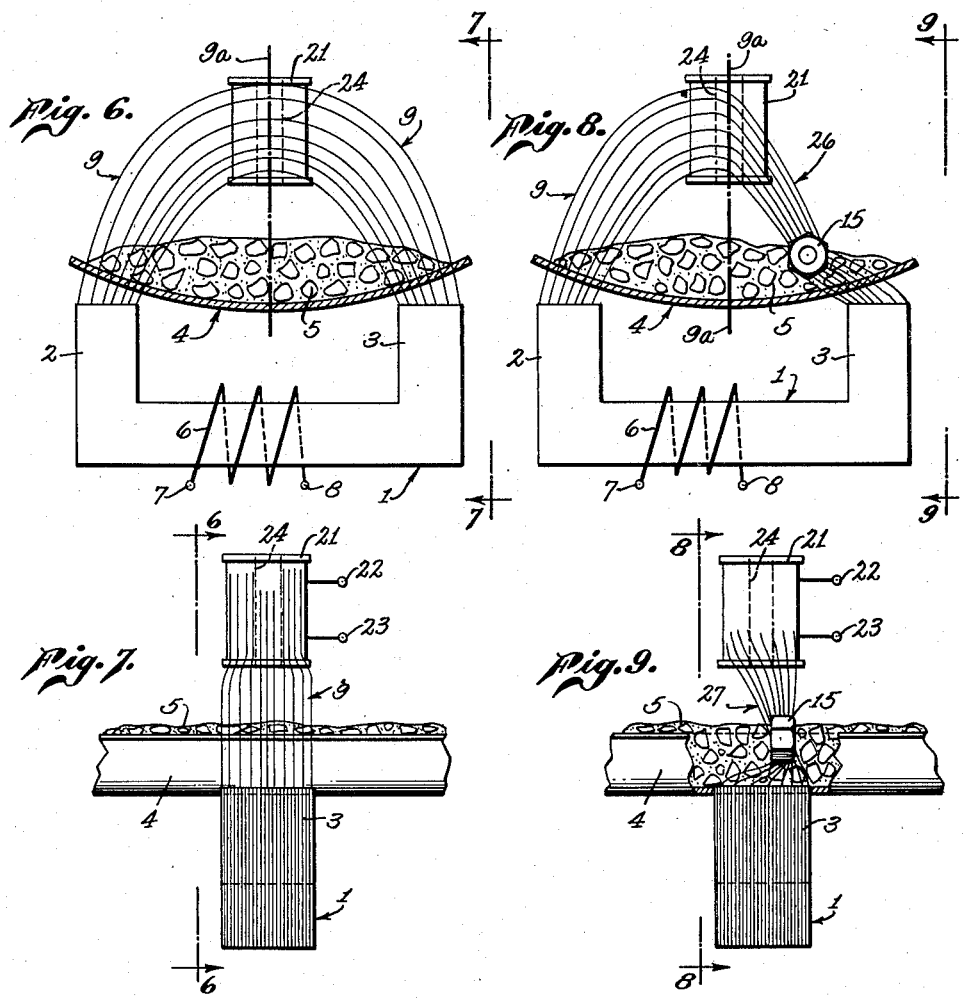
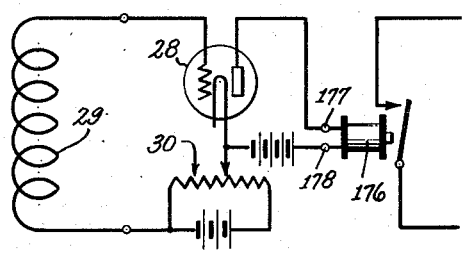
INVENTOR.
Hugh E. Wurzbach
BY
ATTORNEYS Jan. 14, 1941.    H. E. WURZBACH    2,228,294
MAGNETIC MATERIAL DETECTOR
Filed April 26, 1938    3 Sheets-Sheet 3
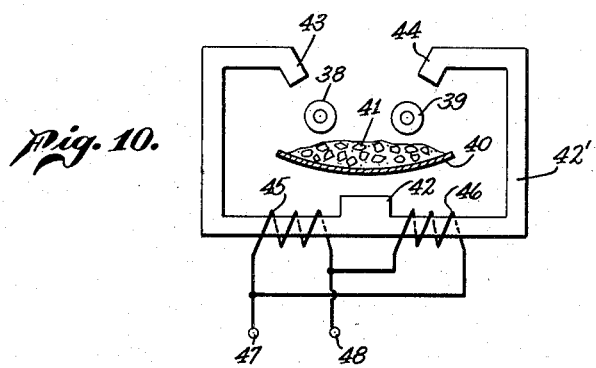
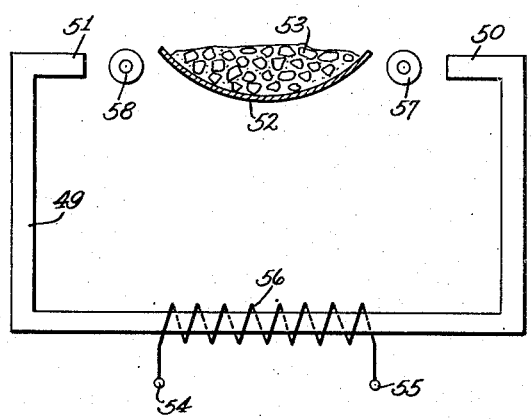
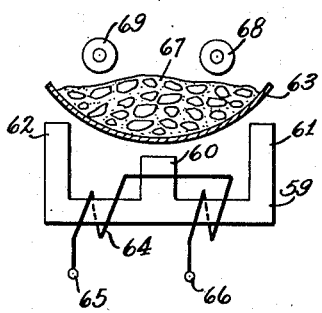
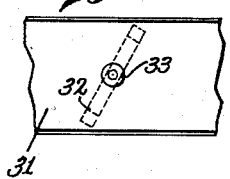
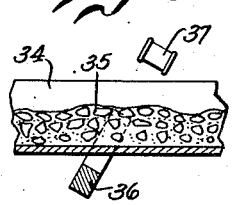
INVENTOR.
Hugh E. Wurzbach
BY
ATTORNEYS Patented Jan. 14, 1941

2,228,294

UNITED STATES PATENT OFFICE 2,228,294

MAGNETIC MATERIAL DETECTOR

Hugh E. Wurzbach, Magna, Utah

Application April 26, 1938, Serial No. 204,353

9 Claims. (Cl. 175—183)

This invention is concerned generally with apparatus for detecting the presence of a moving body of magnetic material and pertains more particularly to an apparatus for the detection of a magnetic contaminant present in a mass of non-magnetic material while said mass of material is in motion, as for example, for the detection of a magnetic object in a body of material on a moving conveyor belt, or on the person of an individual passing through a doorway, or the like.

The principal object of the invention is to provide an apparatus for detecting the presence of magnetic material such as small iron, steel, or nickel masses that are present among non-magnetic materials being conveyed past a given point.

In milling operations in which crushing machinery is used to pulverize the ore in the process of mill concentrate treatment it is not unusual for mine drills or parts thereof or parts of mining machinery to be present in the ore. If these parts are allowed to enter the crushing machinery with the ore they usually cause considerable damage thereto, because they are of iron or hard steel and are relatively non-frangible. In large operations the ore is fed to the crusher by conveyor belts which may be of considerable width, and it is a particular object of this invention to provide an apparatus for detecting the presence of a harmful foreign body in the ore moving on such a conveyor belt, such detection being based on the magnetic properties of such body.

Magnetic material detectors usually operate to stop the conveyor belt so that the harmful magnetic body may be removed from the belt and kept from entering the crusher. Previously proposed magnetic material detectors have been constructed to operate in response to the voltage induced in a detector coil by changes in the total flux linking the coil. The operative change in this total flux results from a change in reluctance of the magnetic circuit carrying the flux, produced by the presence of a magnetic body. However, the flux is usually supplied by a winding on a magnetic core which is energized by the electric supply circuit. In most industrial plants the voltage of the supply circuit is subject to frequent fluctuations of considerable magnitude because of variations in load resulting from starting and stopping various machines. These changes in voltage of the electric supply circuit cause changes in the total flux linking the detector coil and induce voltages therein sufficient to operate the detector apparatus just as though a magnetic body were present on the conveyor belt. As a consequence, the conveyor belt is stopped numerous times when actually there is no magnetic material present, and there is considerable loss in production, time and labor, besides the inconvenience of restarting the conveyor belt.

It is, therefore, an important object of this invention to provide an apparatus which eliminates false indications of the presence of a body of magnetic material that result from changes in voltage of the electric supply circuit connected to the magnetic material detector.

Another object of the invention is to provide a magnetic material detector which may be operated with direct, pulsating, or alternating current of constant or varying magnitude.

A further object of the invention is to associate a suitable work circuit with the detecting apparatus to perform certain operations, such as stopping a conveyor, ringing alarms, and the like, upon the detection of a magnetic body over a given size.

Further objects and advantages of the invention, of which the above are typical, will become apparent as the description proceeds.

The invention comprises, essentially, the provision of a magnetic field extending transversely of the path of the moving material which is under examination for the presence of foreign magnetic bodies, and a detector coil member in this magnetic field with its axis disposed transversely to, and preferably substantially perpendicular to, the normal lines of flux of said field, the normal lines of flux being taken to mean the lines of flux which extend, in the absence of any such foreign magnetic bodies, between the pole faces of the magnet which establishes the field. The axis of the detector coil may lie substantially in a plane of symmetry extending perpendicular to the normal lines of flux in the magnetic field. In any event the detector coil or coils are so positioned and oriented as to have substantially no voltage induced therein by variations in the normal magnetic field. But the turns of the coil are so positioned that an asymmetric distortion of the flux through the coil produced by movement of a magnetic body through the air path induces an appreciable voltage in the coil. A work circuit is associated with the detector coil member and is responsive to voltage changes induced therein by the presence of a body of magnetic material moving, with the material under examination, along a path in position to be influenced by the above-mentioned magnetic field.

The invention also contemplates the provision of a substantially constant magnetic field, as produced by a permanent magnet or by a substantially constant current, or of a pulsating magnetic field, as produced by a pulsating current, or of an alternating magnetic field, as produced by an alternating current.

My invention will be better understood by reference to the accompanying drawings which diagrammatically illustrate typical embodiments of my invention and a work circuit which may be associated therewith, and referring thereto:

Fig. 1 is a partly sectional front elevation, as on line 1—1 in Fig. 2, of an apparatus constructed according to my invention as applied to a conveyor belt, and showing the normal distribution of the lines of flux;

Fig. 2 is a side elevation thereof taken on line 2—2 in Fig. 1;

Fig. 3 is a view similar to Fig. 1 illustrating the asymmetric distortion of the magnetic field produced by the presence of a body of magnetic material;

Fig. 4 is a side elevation taken on line 4—4 in Fig. 3;

Fig. 5 is a wiring diagram of a work circuit which may be employed in conjunction with the detector coil of this invention;

Fig. 6 is a partly sectional front elevation of a variational form of magnetic material detector constructed according to my invention, taken on line 6—6 in Fig. 7, showing a detector coil with its axis disposed in a vertical direction;

Fig. 7 is a side elevation taken on line 6—6 in Fig. 6;

Fig. 8 is a sectional front elevation similar to Fig. 6, taken on line 8—8 in Fig. 9 illustrating the asymmetric distortion of the magnetic field produced by a body of magnetic material;

Fig. 9 is a side elevation thereof taken on line 9—9 in Fig. 8;

Figs. 10, 11, and 12 are partly sectional front elevations illustrating further modifications of my apparatus embodying a plurality of detector coils and variational arrangements of magnet poles;

Figs. 13 and 14 illustrate variational dispositions of the magnet poles with respect to the conveyor belt; and Fig. 15 is a wiring diagram of apparatus which may be employed for adjusting the sensitivity of the apparatus to prevent operation of the work circuit by foreign bodies below a given size.

Referring to Figs. 1 and 2 of the drawings, a simple form of apparatus is shown as comprising a U-shaped metal core 1, of magnetic material such as transformer laminations, providing a pair of opposite pole members 2 and 3 which are shown as extending vertically and disposed toward laterally opposite sides of a conveyor belt 4 upon which is carried a body of material 5. A core energizing coil is shown at 6 provided with terminals 7 and 8 adapted to be connected to any suitable source of electric current, and capable, when current flows through it, of producing a magnetic flux through the core and an air path above and between the poles 2 and 3. Lines 9 are an idealized representation of the normal flux lines passing through the air path between the poles 2 and 3. The conveyor belt may be assumed to be moving perpendicularly to the plane of the paper and the air path between the poles 2 and 3 may be considered as transverse to the conveyor belt and to the path of movement of the material carried thereon.

In any arrangement in which a magnetic flux is caused to flow in an air path between a pair of pole members there is a position in the air path at which an imaginary plane may be located such that the flux is substantially symmetrically disposed on each side of the plane. For example, in the arrangement of Fig. 1, this plane of symmetry is a vertically disposed one, as indicated by the dotted line 9a, midway between the pole members 2 and 3 and extending in the direction of movement of the material 5. A detector coil 10 is shown with its axis disposed horizontally in the above-mentioned plane of symmetry and also, in this instance, parallel to the path of movement of the material 5.

The detector coil or solenoid 10 may comprise a large number of turns of fine insulated wire wound on a suitable form, preferably of insulating material. A suitable magnetic core 11 may be provided therefor and preferably is of substantially the same length as the coil 10 so as to cause the magnetic flux to be concentrated and pass through the turns of the coil. The ends of the wire forming the coil are shown brought out to terminals 12 and 13 which are adapted for connection to a suitable work circuit, as hereinafter described.

The axis of the coil 10 may be assumed to extend in a direction perpendicular to a vertical plane containing the lines of flux 9 passing between the pole members 2 and 3. This is one way of placing the detector coil in said air path with its axis oriented in such a direction that changes in magnitude of the total flux in the magnetic circuit defined by the core member and the pole members 2 and 3 and the air path therebetween, induce only negligible resultant voltages in the coil 10. This condition is fulfilled because opposite sides of each turn in the coil 10 are cut by substantially the same amount of flux, and consequently changes in magnitude of total flux induce equal voltages in opposite directions in the opposite sides of each turn. Hence, the induced voltages in individual turns neutralize each other. The net or resultant voltage induced in each turn under such circumstances is substantially zero and the total voltage induced across the whole coil is substantially zero. Therefore, changes in the total flux, such as may be produced by variations in voltage of the supply circuit connected to the terminals 7 and 8 of the coil 6, produce negligible voltages at the terminals 12 and 13. In other words, the coil 10 is positioned in the air path between the pole members and in the path of the flux but in non-inductive relation thereto. By reason of concentrating the flux in the neighborhood of the coil 10, magnetic core 11 provides a more stabilized condition on each side of the coil 10 and a more sensitive response, as will be brought out hereinafter.

Referring now to Figs. 3 and 4, a body of magnetic material, such as a steel nut 15, is shown present in the material 5 on the belt 4 and in a portion of the air path between the pole members and the detector coil and outside the boundaries of the detector coil which is located wholly on one side of the belt. Upon entering at least a portion of the magnetic circuit the magnetic body 15 causes an asymmetric distortion of the flux lines 9. The body 15 not only tends to displace the flux lines downwardly as noted at 15a in Fig. 3, but also tends to produce a longitudinal displacement of the flux lines with respect to detector coil 10 as noted at 15b in Fig. 4. The displacement of the flux lines from normal is largely limited to one side of the plane 9a, even without core 11, as shown in a theoretical manner in Figs. 3 and 4. As a consequence of this asymmetric distortion of the flux lines in the air path and in the coil 10, there is a change in flux on one side of some turns of the coil 10 with respect to the flux on the other side of the same turns, and a resultant voltage is induced in the coil. It will be appreciated that a voltage will be induced in the coil even though a magnetic core 11 is not present; however, I prefer to use a magnetic core since it increases the sensitivity of the apparatus by maintaining the flux lines on one side of the coil 10 substantially stationary when the flux lines on the other side of the coil 10 are asymmetrically distorted by the presence of a body 15 of magnetic material.

When coil 6 is supplied with direct current, the presence of a moving body 15 of magnetic material in the air path generally causes a somewhat prolonged voltage impulse between the terminals 12 and 13 of the coil 10. If the coil 6 is supplied with alternating current, alternating voltage is generated between the terminals 12 and 13 for as long as the body of material 15 is present in a significant portion of the air path between the pole members 2 and 3, and the flux lines distorted by the magnetic body 15 also pass through the detector coil 10.

A form of work circuit which may be associated with the apparatus above described, as by connection to the terminals 12 and 13 of the detector coil 10 of Figs. 1-4, is illustrated in Fig. 5. Referring to said figure, a motor 171 which may be used to operate any of the conveyor belts shown herein, for example the conveyor belt 4 in Fig. 1, is shown connected through a starting switch 172 to a three-phase power supply. One lead 182 of the power supply is shown connected through actuating coil 173 of a starting switch 172, thence through back contact 183 of a relay 174 and connections 183' and 183" to another lead 184 of the power supply, through a normally open push-button 175. Upon pressing push-button 175 the circuit of the coil 173 is closed, operating the starting switch 172 and maintaining coil 173 in energized relation by establishing contact through normally closed push-button 181, contact 185 of the starting switch 172 to line connection 184, rendering the push-button 175 inoperative.

A normally open relay is shown at 176 with its terminals 177 and 178 adapted for connection to a pair of the above-mentioned detector coil terminals. This relay should be of sufficient sensitivity to close its contact upon receiving a minimum voltage impulse from the associated detector coils in response to the presence of a body of magnetic material of given minimum size. Upon receiving an impulse this relay will momentarily close, energizing the coil of relay 174 for a sufficient time to establish connection at its front contact 186. This relay 174 may be of a type well known to the art which will close its contact in response to a short energizing impulse and will maintain its contact closed for a given time interval after the cessation of the impulse, returning to its position in contact with its front contact 183 at the end of the time interval. Such a relay may be dash-pot or motor operated after a manner well known to the art and need not be described in detail herein. The break of the circuit of relay 174 with its back contact 183 will break the circuit to coil 173, opening switch 172 to stop the motor 171. Closing of relay 174 with its front contact 186 will energize a warning horn 179 and operate the horn for the above-mentioned given time interval. Upon return of the relay 174 to a position contacting its back contact 183, the motor 171 may be set in operation again by pushing the start button 175.

Referring now to Figs. 6 through 9, an arrangement is shown in which the apparatus of Figs. 1 to 4 is modified by placing detector coil 21 with its axis vertical instead of horizontal as shown in Figs. 1 to 4, but still lying in the central plane of symmetry 9a. Detector coil 21 is provided with terminals 22 and 23 and preferably with a magnetic core 24. This illustrates another arrangement in which changes in the total flux caused by changes in voltage of the electric supply circuit connected to the terminals 7 and 8 of the coil 6, induce opposing voltages in each side of each turn of the coil 21 and substantially no resultant voltage between the terminals 22 and 23.

However, as soon as a moving body 15 of magnetic material moves into the field of the air path between the core members 2 and 3 and the detector coil 21, the flux distribution around the coil 21 becomes asymmetric and a resultant voltage is induced between its terminals 22 and 23, as will be apparent in view of the description of Figs. 1 to 4. Thus it may be seen by inspection of Figs. 6 to 9 that the flux lines 9 are relatively symmetrically disposed with respect to the coil 21 in Figs. 6 and 7 which represents the normal condition thereof in the absence of a foreign magnetic body, while the flux distribution is asymmetric in Figs. 8 and 9 because of the presence of a magnetic body, such as a steel nut 15. The presence of the magnetic body causes the flux lines to concentrate therein and produces a vertical displacement toward the conveyor belt, as at 26, and also a horizontal displacement toward the magnetic body, as at 27. On the other side of the coil 21 the flux lines are substantially undisturbed, and there is a resultant change in flux linking some of the turns thereof that produces a resultant voltage across the terminals 22 and 23.

In the forms of my invention illustrated by Figs. 1-9, the axis of the detector coil lies in the plane of symmetry 9a. This location is preferred as it makes the detector non-responsive to changes in total flux and makes a more sensitive device. But under some circumstances, as when substantially constant direct current is applied to terminals 7 and 8, the detector coil may be displaced laterally from plane 9a. The general position of the axis can then be defined as being in a plane parallel to the plane of symmetry, or a plane transverse to the flux path. Of course the displacement of the coil from its preferred position renders it less sensitive, and sufficient displacement makes it inoperative. But assuming only a relatively small displacement of the coil axis from plane 9a, the flux is then not exactly symmetrical about the plane of the coil axis, but distortion caused by magnetic body 15 continues to be asymmetric and to induce a voltage across terminals 11 and 12. Thus it is within the scope of my invention to remove the axis of the detector coil somewhat from the plane of symmetry 9a.

A modified form of my invention is illustrated in Fig. 10, in which two detector coil units 38 and 39 are provided, one in each of two air paths extending transversely with respect to the path of movement of a conveyor belt 40 carrying a body of material 41. The air paths extend between a common pole 42 of a magnetic core 42′, located beneath the conveyor belt and each one of a pair of poles 43 and 44 located above the conveyor belt. Energizing coils are shown at 45 and 46, wound and connected in such manner that, upon connection of an electric supply circuit to terminals 47 and 48, a magnetic flux circuit is provided through the air path between each of the poles 43 and 44 and the common pole 42 in substantially non-inductive relation to the detector coils 38 and 39.

In Fig. 11 I have shown an arrangement in which a magnetic core 49, provided with opposing pole members 50 and 51 located on horizontally opposite sides of a conveyor belt 52 carrying a body of material 53, is energized through connection of terminals 54 and 55 of a coil 56 to an electric supply circuit to provide a flux through the air path and through the material 53 between the pole members 50 and 51. A pair of detector coil units 57 and 58 are shown located adjacent the pole members 50 and 51 respectively, and in non-inductive relation to the flux passing through the air path between the respective pole members. The arrangement shown in Fig. 11 will operate satisfactorily with the omission of either one of the detector coil units 57 or 58, although more sensitive operation may be expected when both detector coil units are used.

In Fig. 12 I have shown an arrangement which is somewhat comparable to that shown in Fig. 10. A detector coil core 59 is provided with a common central pole 60 and a pair of outer poles of opposite polarity 61 and 62 all arranged beneath a conveyor belt 63. An energizing coil 64 is shown wound on the core 59 and provided with terminals 65 and 66 which are adapted upon connection to an electric supply circuit to produce a flux between the pole members 60 and 61 and between the pole members 60 and 62. The flux flows through an air gap between the respective poles and through a body of material 67 carried on the belt 63. Detector coils are provided at 68 and 69 in the respective air paths between the poles 60 and 61, and 60 and 62, and in substantially non-inductive relation with the flux in said paths. It is believed apparent that numerous modifications of the hereinbefore described forms of my invention will manifest themselves to those skilled in the art.

It may be advisable to provide means for preventing voltages of less than predetermined magnitude, for example, voltages produced by magnetic bodies below a given minimum size, from setting the work circuit into operation. Numerous arrangements may be used for this purpose as will be apparent to one skilled in the art. An example of such an arrangement is illustrated diagrammatically in Fig. 15 in which a discharge device 28 is interposed between the terminals 177 and 178 of the work circuit illustrated in Fig. 5 and a detector coil 29. A variable grid bias 30 is placed in series with the detector coil 29 and in the grid circuit of the discharge device 28 so that the discharge device may be biased sufficiently negative to prevent operation of the relay 176 from small voltages induced in the detector coil, and still allow larger voltage impulses resulting from the asymmetric flux distribution produced by a moving body of magnetic material, larger than a given minimum size, to operate the relay 176. Also, the sensitivity of the work circuit may be adjusted by placing a potentiometer across the terminals of the detector coil so that a desired portion of the induced voltage may be fed to the work circuit.

Any suitable form of work circuit including signalling or indicating devices such as shown in Fig. 5 or other arrangements as will be apparent to one skilled in the art, may be associated with the detector coils shown in any of the figures of drawings. When using two or more detector coils, for example as shown in Figs. 10–12, the coils may be connected in series or in parallel to a single work circuit or they each may be connected to separate work circuits.

It is to be appreciated that all the embodiments shown and described herein have been diagrammatic, but it is believed that the necessary structural arrangements will readily appear to those skilled in the art. For example, the detector coils may be held in position on suitable non-magnetic supports such as wooden or brass members and the energizing core members may be constructed from transformer laminations or the like and supported on suitable foundations with angle-iron brackets or other suitable material.

It will be appreciated that if the air path between the pole members 2 and 3 lies substantially in a vertical plane as shown in Figs. 1 through 4, for example, and if the path of movement of the conveyor belt 4 is substantially at right angles to this plane as shown, it is theoretically possible for a moving body of magnetic material to pass symmetrically between the pole members and to produce a symmetrical distortion of the flux passing through the detector coil 10. The possibilities of such an occurrence are extremely remote; however, they may be eliminated by keeping the air path in a vertical plane as shown and positioning the core member producing the flux so that its horizontal longitudinal axis makes an angle other than a right angle with the path of movement of the body on the conveyor belt. Thus, in the diagrammatic plan view in Fig. 13 a conveyor belt is shown at 31 with an energizing core 32 arranged underneath with its longitudinal axis disposed transversely to the belt at an angle other than 90° to the direction of belt movement. A detector coil 33 is placed in a position similar to coil 21 in Fig. 6.

It should also be noted that the theoretical median plane of the flux, passing through the poles and the detector coil, and also if desired including the energizing core, may be oriented in a plane that is not vertical, but is inclined to the horizontal path of movement of the material. This arrangement is illustrated in Fig. 14 in which a conveyor belt 34 is shown in longitudinal section carrying a body of material 35, and one energizing core 36 and a detector coil 37, comprising a detector unit, are shown alined in a plane inclined to the vertical and to the path of movement of material 35. It is, therefore, within the scope of this invention to position the energizing member and the air path between the pole members at any angular position with respect to the path of movement of the body of magnetic material. The apparatus to detect foreign bodies operates as long as the axis of the detector coil is in a plane oriented transversely or substantially at right angles with respect to the lines of flux in the air path, the detector coil then responding to asymmetric changes in flux distribution, but not responding to changes in total flux. The air path is so disposed as to have at least a portion intercepted by the moving body of magnetic material.

It should be noted that in general there may be large bodies of magnetic material disposed in various positions about the detecting apparatus, in the form of machinery, supporting rollers or conveyors, and other iron or steel objects. Such objects will not impair the operation of the detecting apparatus as long as they are stationary or are sufficiently removed not to produce an asymmetric distribution of the flux passing through the detector coil.

I claim:

1. An apparatus for detecting the presence of a moving body of magnetic material which comprises: means including a core of magnetic material for producing magnetic flux in an air path of substantial dimensions; and a detector coil disposed in said air path with its axis in a plane transverse to the normal lines of flux therein and with the turns of the coil so positioned that changes in the total flux induce negligible voltage in said coil and an asymmetric distortion of the flux through the coil produced by movement of a magnetic body through the air path outside the boundaries of said coil induces appreciable voltage in the coil.

2. An apparatus for detecting the presence of a moving body of magnetic material which comprises: means including a core of magnetic material for producing magnetic flux in an air path of substantial dimensions; and a detector coil disposed in said air path with its axis in a plane substantially perpendicular to the normal lines of flux therein and with the turns of the coil so positioned that changes in the total flux induce negligible voltage in said coil and an asymmetric distortion of the flux through the coil produced by movement of a magnetic body through the air path outside the boundaries of said coil induces appreciable voltage in the coil.

3. An apparatus for detecting the presence of a moving body of magnetic material which comprises: means including a core of magnetic material for producing magnetic flux in an air path of substantial dimensions; and a detector coil disposed in said air path with its axis in a plane of symmetry with respect to the normal lines of flux therein and with the turns of the coil so positioned that changes in the total flux induce negligible voltage in said coil and an asymmetric distortion of the flux through the coil produced by movement of a magnetic body through the air path outside the boundaries of said coil induces appreciable voltage in the coil.

4. An apparatus for detecting the presence of a moving body of magnetic material which comprises: a magnetic core providing a pair of spaced-apart pole members; a winding on said core; an electric supply circuit connected to said winding for producing flux in said core and through an air path of substantial dimensions between said pole members; and a detector coil disposed in said air path with its axis in a plane transverse to the normal lines of flux therein and with the turns of the coil so positioned that changes in the total flux produced by changes in voltage of the electric supply circuit induce negligible voltages in said coil and an asymmetric distortion of the flux through the coil produced by movement of a magnetic body through the air path outside the boundaries of said coil induces appreciable voltage in the coil.

5. An apparatus for detecting the presence of a moving body of magnetic material which comprises: a magnetic core providing a pair of spaced-apart pole members; a winding on said core; an electric supply circuit connected to said winding for producing flux in said core and through an air path of substantial dimensions between said pole members; and a detector coil disposed in said air path with its axis in a plane substantially perpendicular to the normal lines of flux therein and with the turns of the coil so positioned that changes in the total flux produced by changes in voltage of the electric supply circuit induce negligible voltages in said coil and an asymmetric distortion of the flux through the coil produced by movement of a magnetic body through the air path outside the boundaries of said coil induces appreciable voltage in the coil.

6. An apparatus for detecting the presence of a moving body of magnetic material which comprises: a magnetic core providing a pair of spaced-apart pole members; a winding on said core; an electric supply circuit connected to said winding for producing flux in said core and through an air path of substantial dimensions between said pole members; and a detector coil disposed in said air path with its axis in a plane of symmetry substantially perpendicular with respect to the normal lines of flux therein and with the turns of the coil so positioned that changes in the total flux induce negligible voltage in said coil and an asymmetric distortion of the flux through the coil produced by movement of a magnetic body through the air path outside the boundaries of said coil in a direction parallel to said plane induces voltage in the coil.

7. An apparatus for indicating the presence of a magnetic body in material carried on a moving conveyor belt, which comprises: means including a core of magnetic material for producing magnetic flux in an air path of substantial dimensions extending through said material on said belt; and a detector coil located wholly on one side of said belt and disposed in said air path with its axis in a plane transverse to the normal lines of flux therein and with the turns of the coil so positioned that changes in the total flux induce negligible voltage in said coil and an asymmetric distortion of the flux through said coil produced by movement of a magnetic body with the material on said belt through said air path induces appreciable voltage in said coil.

8. An apparatus for indicating the presence of a magnetic body in material carried on a moving conveyor belt, which comprises: a magnetic core providing a pair of spaced-apart pole members adjacent said belt; a winding on said core; an electric supply circuit connected to said winding for producing flux in said core and in an air path of substantial dimensions extending between said pole members and through material on said belt; and a detector coil located wholly on one side of said belt and disposed in said air path with its axis in a plane transverse to the normal lines of flux therein and with the turns of the coil so positioned that changes in the total flux induce negligible voltage in said coil and an asymmetric distortion of the flux through the coil produced by movement of a magnetic body on said belt through the air path induces appreciable voltage in the coil.

9. Apparatus for indicating the presence of a magnetic body in material carried on a moving conveyor belt, which comprises: a magnetic core beneath said belt providing a pair of spaced pole members disposed toward the longitudinal edges of the belt; a winding on said core; an electric supply circuit connected to said winding for producing flux in said core and in an air path of substantial dimensions extending transversely across the belt between said pole members and through material on said belt; and a detector coil located wholly on one side of said belt and disposed above the belt in said air path with its axis in a vertical plane transverse to the normal lines of flux in the path and substantially parallel to the direction of belt movement, the turns of the coil being so positioned that changes in the total flux induce negligible voltage in said coil and an asymmetric distortion of the flux through the coil produced by movement of a magnetic body on said belt through a portion of the air path induces voltage in the coil.

HUGH E. WURZBACH.